Sept. 2, 1941.        W. E. ZIERER        2,254,343
WINDSHIELD CLEANER
Filed Dec. 5, 1938
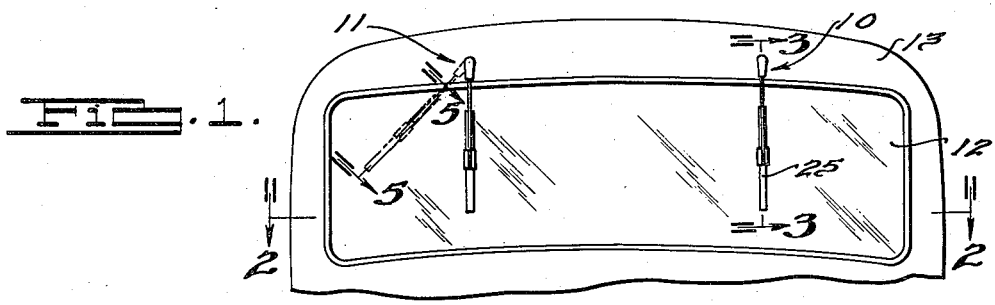
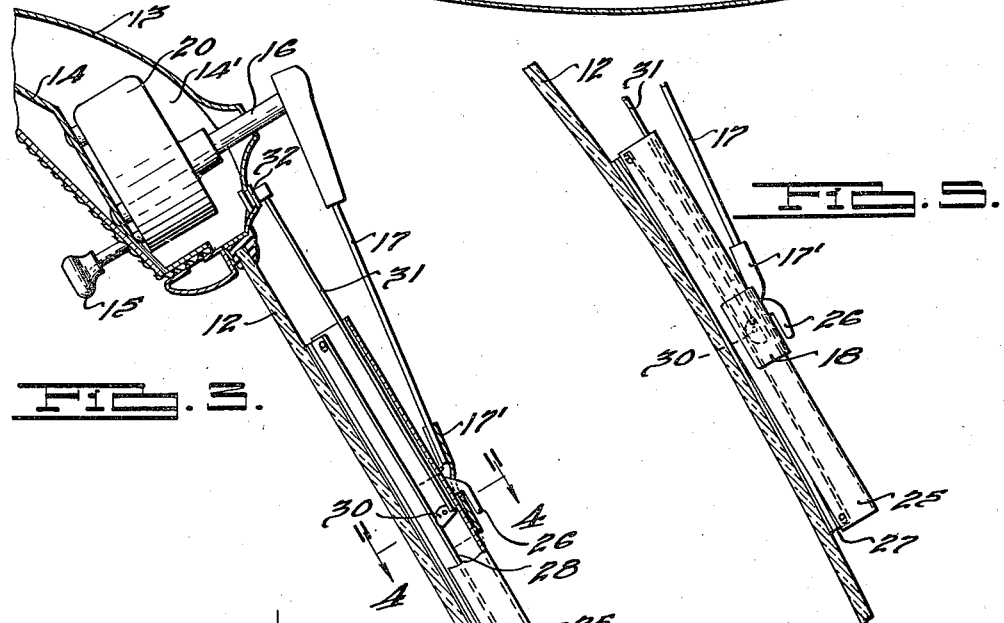
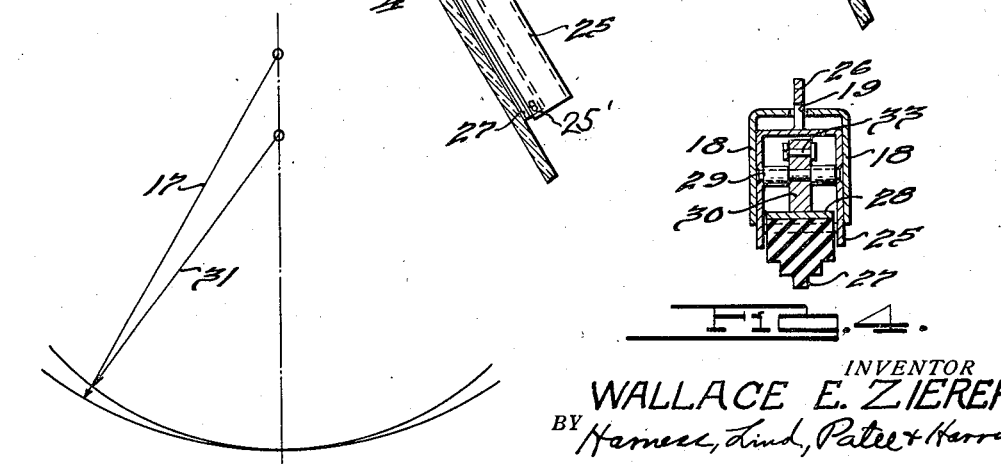
INVENTOR
WALLACE E. ZIERER
BY Harness, Lind, Patee & Harris
ATTORNEYS.

Patented Sept. 2, 1941

2,254,343

UNITED STATES PATENT OFFICE 2,254,343

WINDSHIELD CLEANER

Wallace E. Zierer, Highland Park, Mich., assignor to Chrysler Corporation, Highland Park, Mich., a corporation of Delaware Application December 5, 1938, Serial No. 243,953

6 Claims. (Cl. 15—255)

This invention relates to improved window cleaners, and particularly pertains to cleaners for cleaning curved windshields of vehicles.

The main object of the invention is to provide an improved windshield wiper, or cleaner, having a wiper blade contacting the surface of a curved windshield substantially uniformly during oscillatory movement thereover.

Further objects of the invention are to provide a windshield cleaner of this character having a normally curved flexible cleaner element which is automatically straightened to a desired degree during movement of the element over a predetermined portion of the windshield; and to provide a windshield cleaner of this kind in which the contact pressure of the wiper blade on various portions of the windshield may be predetermined.

Other objects and advantages of the invention will be more apparent from the following description taken in connection with the accompanying drawing, in which:

Fig. 1 is a fragmentary, front elevational view of the front of a vehicle on which a pair of windshield cleaners embodying the invention have been mounted.

Fig. 2 is a horizontal sectional view taken as indicated by the line 2—2 of Fig. 1.

Fig. 3 is an enlarged vertical sectional view taken approximately as indicated by the line 3—3 of Fig. 1.

Fig. 4 is a substantially horizontal sectional view taken along the line 4—4 of Fig. 3.

Fig. 5 is a sectional view taken along the line 5—5 of Fig. 1 and illustrating the wiper blade at one end of its travel.

Fig. 6 is a diagrammatic representation of the movement of the cleaner linkage during operation.

In the form of the invention illustrated in the drawing, the improved windshield cleaners 10 and 11 are substantially identical and a description of one will therefore be adequate. The cleaners 10 and 11 are illustrated as operating on a vehicle windshield 12 having a vertical axis of curvature. The vehicle body 13 includes a header member 14 spaced from the outer shell of the top portion of the vehicle body to form a space 14'.

The improved windshield cleaner comprises a motor 20 enclosed within the space 14'. The motor may be actuated by suction from the vehicle motor intake manifold, by current from the vehicle battery, or by some other source of energy. A finger operated member 15 protrudes rearwardly into the driver's compartment of the vehicle and is adapted to be operated to start and stop the operation of the motor 20.

The motor 20 has a drive shaft 16, which projects forwardly through the body shell 13, and on which is yieldably mounted a cleaner arm 17. Arm 17 has fixed thereto at its lower end a channel-shaped member 17' having flanges 18.

Secured to the member 17', between flanges 18, is a wiper blade structure generally designated by the numeral 25 on the drawing (see Fig. 5). The structure 25 has a latch portion 26 which interlocks with a slot 19 in the member 17' to form a relatively loose connection between the wiper 25 and the arm 17.

The wiper structure 25 comprises a normally curved wiper element 27, preferably of rubber, which is secured to a spring steel back portion 28. The back 28 is, in turn, secured at each of its ends to each flange of the channel-shaped member 25 by a pin and slot connection generally indicated by the reference numeral 25'. A cam 30 is pivotally mounted on the pin 29 within the channel of member 17' and has operative engagement with the back portion 28 of element 27.

An arm 31, of shorter length than the arm 17, is pivoted to the outer body shell at 32 on an axis vertically parallel with the axis of shaft 16. The lower end of arm 31 is pivotally secured at 33 to the cam 30.

When the wiper element 27 is at one of its extreme oscillative positions (as indicated by the dotted lines in Fig. 1) its normal contour corresponds to the curvature of the windshield at that position (see Fig. 5) and the low side of cam 30 is in contact with the back portion 28 of the wiper element. Swinging of the arm 17 to its central vertical position (illustrated in Figs. 1 and 3) the arm 31 exerts a gradual push to position the high side of cam 30 against the back 28. This is due to the difference in length between arms 31 and 17 and results in the member 25 being flattened to conform to the surface of the windshield at this position, which is of course, flat. Relative movement between the back 28 and the member 25 is accommodated by the elongated slots which form part of the connection between these members. It is therefore apparent that the cam 30 will operate to allow the wiper member to conform to the curvature of the windshield throughout its entire path of oscillation.

The improved cleaner has been illustrated and described as operating on a windshield having a vertical axis of curvature. It is, of course, understood that the cleaner can be made to operate on windshields having a horizontal or an oblique axis of curvature by merely altering the shape of the cam 30. Various other modifications and changes in the illustrated application of the invention may be effected without departing from the spirit of the invention or from the scope of the appended claims.

What I claim is:

1. A windshield cleaner for cleaning the curved surface of a windshield comprising an oscillatable driven shaft, a wiper element supporting arm operably connected to said shaft, a wiper element supported at one end of said arm, and cam operated means operably associated with said arm and said element for modifying the curvature of said element as it is oscillated over said surface.

2. A windshield cleaner for cleaning the curved surface of a windshield comprising an oscillatable shaft, a wiper element supporting arm operably connected to said shaft, a normally curved wiper element supported at one end of said arm, and means for modifying the curvature of said element as it is oscillated over said surface, said means comprising a cam and means for actuating said cam.

3. A windshield cleaner comprising a driven shaft, a cleaner arm operatively connected thereto for oscillative movement in a defined path, a cleaner blade structure secured to said arm and including a wiper element having a flexible metal back portion, a cam carried by said structure with its face in operative engagement with said back portion, and means for automatically actuating said cam during movement of said arm.

4. A windshield cleaner comprising a driven shaft, a cleaner arm operatively connected thereto for movement in a defined path, a cleaner structure secured to said arm and including a wiper element with a flexible metal back portion, a cam carried by said structure with its face in operative engagement with said back, and a pivotally mounted arm of different length than the first said arm and operatively connected with said cam.

5. A windshield cleaner for a vehicle windshield, having curved surface portions including a driven shaft, a cleaner arm operatively connected thereto for movement in a defined path, a cleaner structure secured to said arm and including a normally curved wiper element having a flexible metal back portion, a pivotally mounted cam carried by said structure with its face in operative engagement with said back, and an arm of shorter length than the first said arm pivotally mounted on an axis substantially vertically parallel with the axis of said longer arm operatively connected with said cam.

6. In a windshield cleaner for cleaning the curved surface of a windshield, a cleaner structure pivotally mounted on a support adjacent one edge of said windshield, said structure comprising a wiper element having a flexible backing member and a normally curved wiper in contact with said surface, a cam carried by said structure with its face in operative engagement with said backing member, an arm pivotally mounted on said support and operatively connected to said cam, and means for oscillating said cleaner structure about its pivot.

WALLACE E. ZIERER.